United States Patent (10) Patent No.: US 11,105,389 B2
Goldring et al. (45) Date of Patent: Aug. 31, 2021

(54) COMPOSITE SHOCK STRUT CYLINDER WITH INTEGRAL METALLIC LOWER BEARING CARRIER AND SLEEVE

(71) Applicant: GOODRICH CORPORATION, Charlotte, NC (US)

(72) Inventors: Eric Goldring, Milton (CA); Rony Giovanni Ganis, Oakville (CA)

(73) Assignee: Goodrich Corporation, Charlotte, NC (US)

( * ) Notice: Subject to any disclaimer, the term of this patent is extended or adjusted under 35 U.S.C. 154(b) by 110 days.

(21) Appl. No.: 16/277,729

(22) Filed: Feb. 15, 2019

(65) Prior Publication Data

US 2020/0263753 A1 Aug. 20, 2020

(51) Int. Cl.
*F16F 9/32* (2006.01)
*B60G 13/06* (2006.01)

(52) U.S. Cl.
CPC ............ *F16F 9/3235* (2013.01); *B60G 13/06* (2013.01); *B60G 2202/24* (2013.01); *F16F 2224/0208* (2013.01); *F16F 2224/0241* (2013.01); *F16F 2226/04* (2013.01); *F16F 2232/08* (2013.01); *F16F 2238/04* (2013.01)

(58) Field of Classification Search
CPC ............ F16F 9/3235; F16F 2224/0208; F16F 2224/0241; F16F 2226/04; F16F 2232/08; F16F 2238/04; B64C 25/00; B64C 2025/006; B64C 25/60; B64C 25/62; B60G 13/06; B60G 2202/24
See application file for complete search history.

(56) References Cited

U.S. PATENT DOCUMENTS

| 5,472,071 A | * | 12/1995 | Zimmermann | ........... B60G 3/01 188/322.19 |
| 2010/0006698 A1 | | 1/2010 | Steinke et al. | |
| 2010/0181423 A1 | | 7/2010 | Martin et al. | |
| 2010/0219290 A1 | * | 9/2010 | Luce | ....................... B64C 25/14 244/102 SL |
| 2016/0146285 A1 | | 5/2016 | Wilkin | |

FOREIGN PATENT DOCUMENTS

| DE | 10003046 | 8/2001 |
| EP | 3192737 | 7/2017 |
| FR | 1256959 | 3/1961 |
| GB | 2076095 | 11/1981 |
| GB | 2290595 | 1/1996 |

OTHER PUBLICATIONS

European Patent Office, European Search Report dated Jul. 16, 2020 in Application No. 19215148.8.

* cited by examiner

*Primary Examiner* — Melanie Torres Williams
(74) *Attorney, Agent, or Firm* — Snell & Wilmer L.L.P.

(57) ABSTRACT

A metallic liner includes a cylindrical body defining a wear resilient surface, and a bearing carrier extending radially inward from the wear resilient surface, wherein the wear resilient surface and the cylindrical body are formed as a monolithic piece.

13 Claims, 3 Drawing Sheets

COMPOSITE SHOCK STRUT CYLINDER WITH INTEGRAL METALLIC LOWER BEARING CARRIER AND SLEEVE

FIELD

The present disclosure relates to shock strut systems, and more specifically, to cylinders for shock struts.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear, and absorb and damp loads imposed on the gear during landing, taxiing, braking, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, similar to a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

SUMMARY

A metallic liner is disclosed, comprising a cylindrical body defining a wear resilient surface, and a bearing carrier extending radially inward from the wear resilient surface, wherein the wear resilient surface and the cylindrical body are formed as a monolithic piece.

In various embodiments, the bearing carrier comprises a carrier surface.

In various embodiments, an inner diameter of the carrier surface is less than an inner diameter of the wear resilient surface.

In various embodiments, the cylindrical body, the bearing carrier, the wear resilient surface, and the carrier surface, are concentric.

In various embodiments, the metallic liner further comprises a geometric feature extending from the cylindrical body, wherein the geometric feature, the wear resilient surface, and the cylindrical body are formed as the monolithic piece.

In various embodiments, the metallic liner further comprises a locking ring slot disposed in the wear resilient surface.

In various embodiments, the locking ring slot is disposed at a second end of the cylindrical body and the bearing carrier is disposed at a first end of the cylindrical body.

In various embodiments, the cylindrical body comprises a first open end and a second open end.

In various embodiments, the bearing carrier defines a first slot, a second slot, and a third slot.

A strut cylinder is disclosed, comprising a composite layer and a metallic liner disposed within the composite layer, the metallic liner comprising a cylindrical body defining a wear resilient surface, and a bearing carrier extending radially inward from the wear resilient surface, wherein the wear resilient surface and the cylindrical body are formed as a monolithic piece.

In various embodiments, the bearing carrier comprises a carrier surface, an inner diameter of the carrier surface is less than an inner diameter of the wear resilient surface.

In various embodiments, the composite layer, the cylindrical body, the bearing carrier, the wear resilient surface, and the carrier surface, are concentric.

In various embodiments, the metallic liner further comprises a geometric feature extending from the cylindrical body, wherein the geometric feature, the wear resilient surface, and the cylindrical body are formed as the monolithic piece.

In various embodiments, the metallic liner further comprises a locking ring slot disposed in the wear resilient surface, wherein the locking ring slot is disposed at a second end of the cylindrical body and the bearing carrier is disposed at a first end of the cylindrical body.

In various embodiments, the cylindrical body comprises a first open end and a second open end.

In various embodiments, the bearing carrier defines a first slot, a second slot, and a third slot.

A method for manufacturing a strut cylinder is disclosed, comprising forming a metallic liner, and disposing a composite layer about the metallic liner, wherein the metallic liner comprises a cylindrical body defining an inner diameter surface, and a bearing carrier extending radially inward from the wear resilient surface, wherein the bearing carrier and the cylindrical body are formed as a monolithic piece.

In various embodiments, the method further comprises forming the bearing carrier at the inner diameter surface of the cylindrical body.

In various embodiments, the method further comprises forming a geometric feature at an outer diameter surface of the cylindrical body.

In various embodiments, the method further comprises forming a locking ring groove at the inner diameter surface of the cylindrical body, wherein the bearing carrier is disposed at a first open end of the cylindrical body and the locking ring groove is disposed at a second open end of the cylindrical body.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
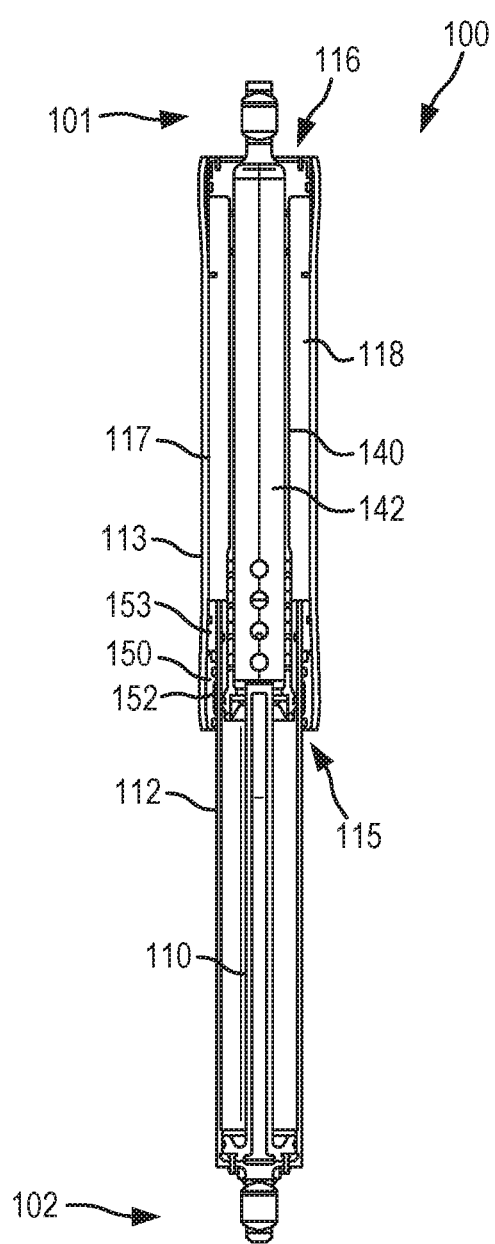
FIG. 1 illustrates a schematic of a shock strut comprising a composite strut cylinder with a monolithic metallic lower bearing carrier and sleeve, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Pinned shock strut cylinders (e.g., those used in trailing arm gears) are good candidates for composite materials due to their relatively simple geometry and their relatively simple loading (i.e., they tend to experience minimal bending). However, the inner diameter is a primary functional wear surface, for which conventional composites may present issues.

As disclosed herein, a shock strut cylinder may comprise a cylinder comprised of a non-metallic material, and a metallic sleeve, wherein the metallic sleeve defines an inner diameter surface of the cylinder and the non-metallic material defines an outer diameter surface of the cylinder. The disclosed shock strut cylinder may provide weight-savings, while maintaining wear resistance at the inner diameter surface, as well as ease of manufacturing.

With reference to FIG. 1, a section view of a shock strut 100 in a fully extended position is illustrated, in accordance with various embodiments. Shock strut 100 may be configured to absorb and dampen forces transmitted between a vehicle and the ground. Shock strut 100 may comprise a strut piston 112 and a strut cylinder 113. Strut cylinder 113 may be configured to receive strut piston 112 in a manner that allows the two components to telescope together and absorb and dampen forces transmitted between a first end 101 (also referred to herein as a proximal end) and a second end 102 (also referred to herein as a distal end) of shock strut 100. In various embodiments, a fluid, such as a hydraulic fluid, and oil, and/or a gas is located within strut cylinder 113. Strut cylinder 113 and strut piston 112 may, for example, be configured to seal such that liquid contained within strut cylinder 113 is prevented from leaking as strut piston 112 translates relative to strut cylinder 113. Further, strut cylinder 113 may be configured to contain a gas such as nitrogen gas or air. Shock strut 100 may comprise a proximal end 101 and a distal end 102, wherein the distal end 102 is opposite the proximal end 101, the distal end 102 being the end of the shock strut closest to a wheel or wheel assembly of a vehicle. A gas chamber may be positioned above an oil chamber (referred to as an "air-over-oil" arrangement) or vice versa, where the term "above" in this context means in the direction of the proximal end 101 of the shock strut 100. Similarly, strut cylinder 113 and strut piston 112 may be sealed such that gas is prevented from leaking as strut piston 112 moves relative to strut cylinder 113. As such, shock strut 100 may comprise a pressurized environment within strut cylinder 113.

In various embodiments, the strut cylinder 113 may comprise a hollow circular tube having various components disposed within. Strut cylinder 113 may comprise a strut chamber 118. Strut cylinder 113 may comprise an orifice support tube 140. Orifice support tube 140 may comprise a hollow tube having a plurality of orifices through which oil or gas may travel. In this regard, orifice support tube 140 may comprise a tube channel 142 in fluid communication with strut chamber 118. In this regard strut chamber 118 may comprise tube channel 142 defined by orifice support tube 140. Orifice support tube 140 may be placed into strut cylinder 113 via second open end 116. Various fluids may be disposed in strut chamber 118. Air may be disposed within strut chamber 118. Oil may be disposed within strut chamber 118, whether alone or in combination with a gas such as air or nitrogen gas.

In various embodiments, strut piston 112 may comprise a hollow circular tube. At least a portion of strut piston 112 may be received by first open end 115 of strut cylinder 113. Strut piston 112 may comprise a metering pin 110. Metering pin 110 may move with strut piston 112 with respect to strut cylinder 113. Metering pin 110 may be received in orifice support tube 140. Strut piston 112 may be reciprocally received within the strut cylinder 113. In various embodiments, strut piston 112 may be reciprocally received within strut cylinder 113 in a concentric relationship with and between the strut cylinder 113 and orifice support tube 140.

In various embodiments, one or more bearings may be disposed between strut cylinder 113 and strut piston 112 against which the strut piston 112 slides. Strut cylinder 113 may comprise a bearing carrier 150 for retaining a lower bearing 152. Bearing carrier 150 may be disposed at first open end 115 of strut cylinder 113. An upper bearing 153 may be coupled to strut piston 112. Upper bearing 153 may slide against a smooth inner diameter surface 117 of strut cylinder 113 in response to strut piston 112 moving axially with respect to strut cylinder 113.

Figure 2A:
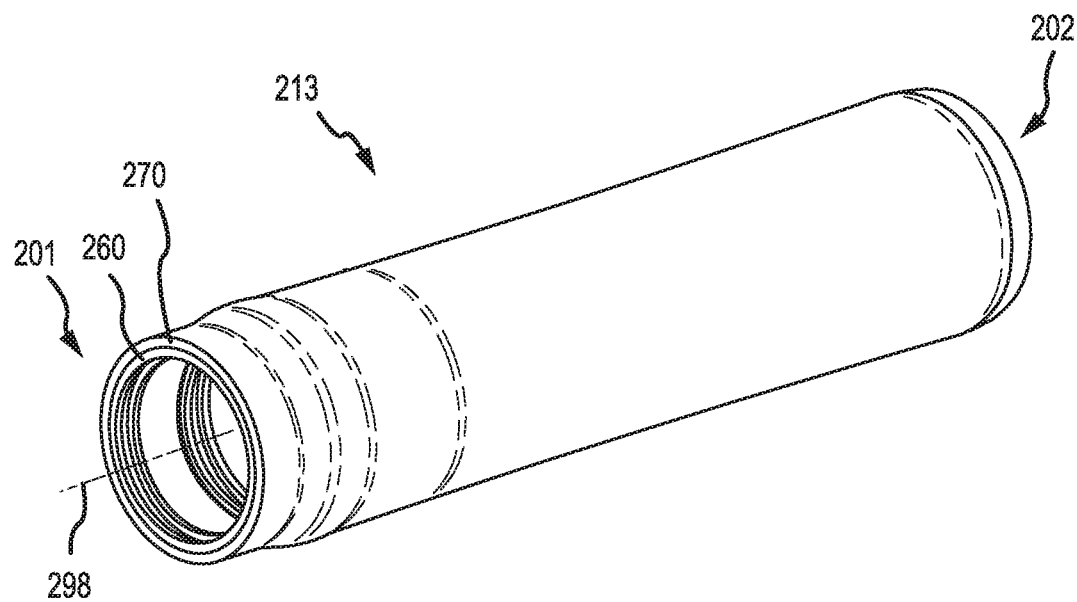
FIG. 2A illustrates a perspective view of a shock strut cylinder comprising a metallic cylindrical body having an integral bearing carrier and a composite layer surrounding the cylindrical body, in accordance with various embodiments.
Figure 2B:
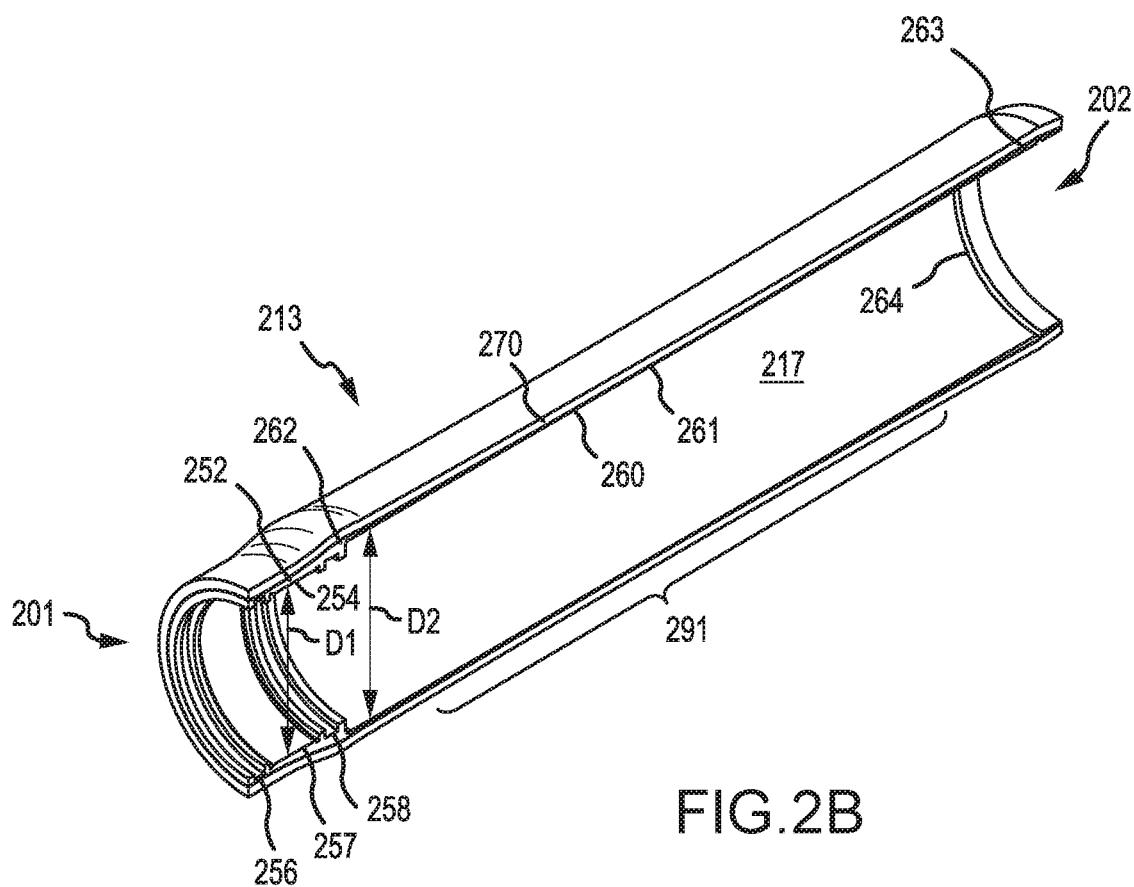
FIG. 2B illustrates a section view of the shock strut cylinder of FIG. 2A, in accordance with various embodiments.

With combined reference to FIG. 2A and FIG. 2B, a strut cylinder 213 is illustrated, in accordance with various embodiments. Strut cylinder 213 may be similar to strut cylinder 113 of FIG. 1, in accordance with various embodiments. Strut cylinder 213 may extend longitudinally between a first end 201 and a second end 202 along a centerline axis 298. Strut cylinder 213 comprises a metallic liner 260 and a composite layer 270. Metallic liner 260 may be comprised of a metal or metal alloy, such as steel, stainless steel, aluminum, nickel, and/or bronze, among others. Metallic liner 260 may be formed using additive manufacturing techniques, subtractive manufacturing techniques, and/or casting. Metallic liner 260 may be formed as a round tube. Metallic liner 260 may provide a wear resilient surface 217 against which an upper bearing 153 of a strut piston 112 may slide, with momentary reference to FIG. 1. Furthermore, metallic liner 260 may serve as a mandrel for depositing composite layer 270.

In various embodiments, composite layer 270 may be wrapped around metallic liner 260. In this regard, composite layer 270 may be formed as a tube enclosing metallic liner 260. In various embodiments, composite layer 270 comprises a fiber-reinforced polymer. In various embodiments, composite layer 270 comprises a glass fiber reinforced epoxy. In various embodiments, composite layer 270 comprises a carbon fiber reinforced epoxy. Composite layer 270 transfer structural loads through strut cylinder 213. Composite layer 270 may be tailored to provide a pre-determined hoop strength for strut cylinder 213. Composite layer 270 may be tailored to provide a pre-determined stiffness for strut cylinder 213. For example, a wall-thickness of composite layer 270 may be tailored for pre-determined load ratings (e.g., circumferential stress, bending stress, axial forces, torsion, internal pressure, etc.) depending on the desired use of strut cylinder 213.

With particular focus on FIG. 2B, metallic liner 260 may comprise a cylindrical body 261 defining wear resilient surface 217 and a bearing carrier 252 extending radially inward from wear resilient surface 217. Bearing carrier 252 may be disposed at first end 201. Bearing carrier 252 and cylindrical body 261 may be manufactured as a single piece. Stated differently, bearing carrier 252 and cylindrical body 261 may be manufactured as one, monolithic piece. Bearing carrier 252 may comprise a carrier surface 254. The inner diameter D1 (also referred to herein as a carrier inner diameter) of metallic liner 260 at bearing carrier 252 may be less than the inner diameter D2 (also referred to herein as a main chamber inner diameter) of wear resilient surface 217. In this regard, carrier surface 254 may comprise inner diameter D1. Inner diameter D2 may be constant from second end 202 to bearing carrier 252.

In various embodiments, bearing carrier 252 comprises a first slot 256 for retaining a scraping member (also referred to as a scraper). In various embodiments, bearing carrier 252 comprises a second slot 257 for retaining a bearing member (also referred to as a bearing). In various embodiments, bearing carrier 252 comprises a third slot 258 for retaining a sealing member (also referred to as a seal). Second slot 257 may be disposed longitudinally between first slot 256 and third slot 258.

In various embodiments, the wall-thickness of metallic liner 260 (i.e., the thickness of metallic liner 260 in the radial direction) may be tapered from first end 201 towards a mid-section 291 of metallic liner 260. The wall-thickness of metallic liner 260 may be tapered from second end 202 towards mid-section 291 of metallic liner 260. In various embodiments, the wall thickness of mid-section 291 may be minimized to maximize weight savings, while providing a surface onto which composite layer 270 may be installed. In various embodiments, metallic liner 260 may comprise a minimum wall thickness at mid-section 291. Stated differently, the wall thickness of metallic liner 260 may be the least at mid-section 291.

In various embodiments, metallic liner 260 may comprise a first geometric feature 262 extending radially outward from cylindrical body 261 (also referred to herein as a sleeve). Geometric feature 262 may aide in retaining composite layer 270 to metallic liner 260. Geometric feature 262 and cylindrical body 261 may be manufactured as a single piece of material. In various embodiments, metallic liner 260 may comprise a second geometric feature 263 extending radially outward from cylindrical body 261. Geometric feature 263 may aide in retaining composite layer 270 to metallic liner 260. Geometric feature 263 and cylindrical body 261 may be manufactured as a single, monolithic piece of material.

In various embodiments, metallic liner 260 may comprise a locking ring groove 264 disposed in wear resilient surface 217 at second end 202. Locking ring groove 264 may provide a groove or slot into which a lock ring may be disposed for retaining an orifice support tube (e.g., orifice support tube 140 of FIG. 1) in strut cylinder 213. For example, an orifice support tube may be placed into strut cylinder 213 via second end 202 and a lock ring may be snapped into locking ring groove 264 for retaining the orifice support tube in strut cylinder 213.

Figure 3:
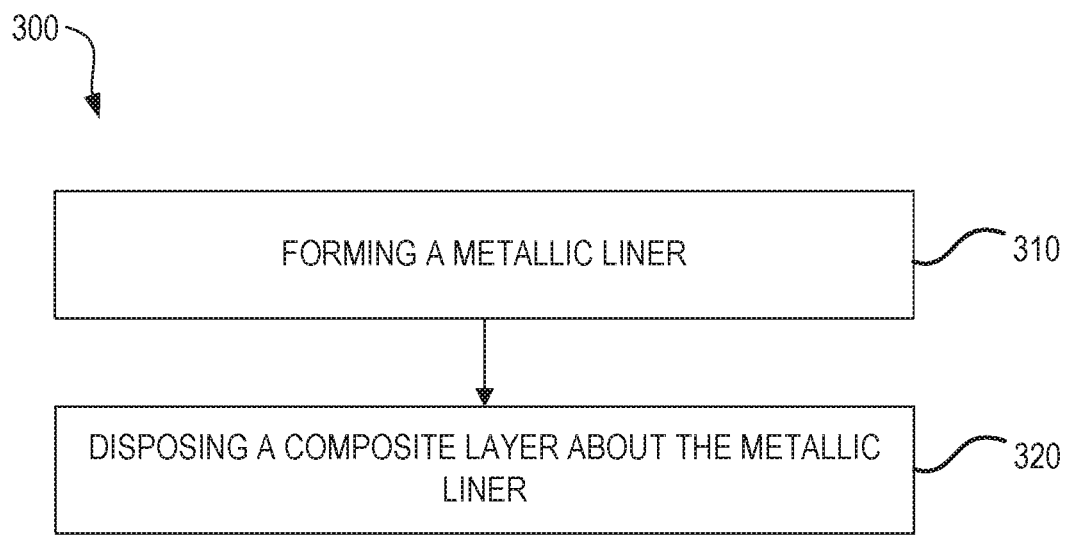
FIG. 3 illustrates a method for manufacturing a strut cylinder, in accordance with various embodiments.

With reference to FIG. 3, a method 300 for forming a strut cylinder 213 is provided, in accordance with various embodiments. Method 300 includes forming a metallic liner (step 310). Method 300 includes disposing a composite layer about the liner (step 320).

With combined reference to FIG. 2A, FIG. 2B, and FIG. 3, step 310 may include forming metallic liner 260. Metallic liner 260 may be formed using any suitable manufacturing technique, including additive manufacturing techniques, subtractive manufacturing techniques, and/or casting.

Step 320 may include disposing composite layer 270 about metallic liner 260. In various embodiments, composite layer 270 is wrapped around metallic liner 260 using a filament winding process. The fibers of composite layer 270 may be oriented appropriately during the filament winding process, tailoring strut cylinder 213 to handle pre-determined loads. In various embodiments, composite layer 270 is wrapped around metallic liner 260 using a pre-preg roll wrapping process. In a pre-preg roll wrapping process, the pre-preg may be cut into patterns with specific fiber orientations. The patterns may be rolled onto a mandrel (e.g., metallic liner 260) and then wrapped with a thin plastic film. The plastic film applies pressure and contains the resin during a curing cycle. After the part has cured, the plastic film is removed. In various embodiments, heat is applied to composite layer 270 to harden composite layer 270 during the curing process. In various embodiments, composite layer 270 is cured using a curing agent (hardener), such as a hydrogen-containing compound, an anionic or cationic initiator, or a reactive cross-linker. Metallic liner 260 may serve as a mandrel during step 320.

Figure 4:
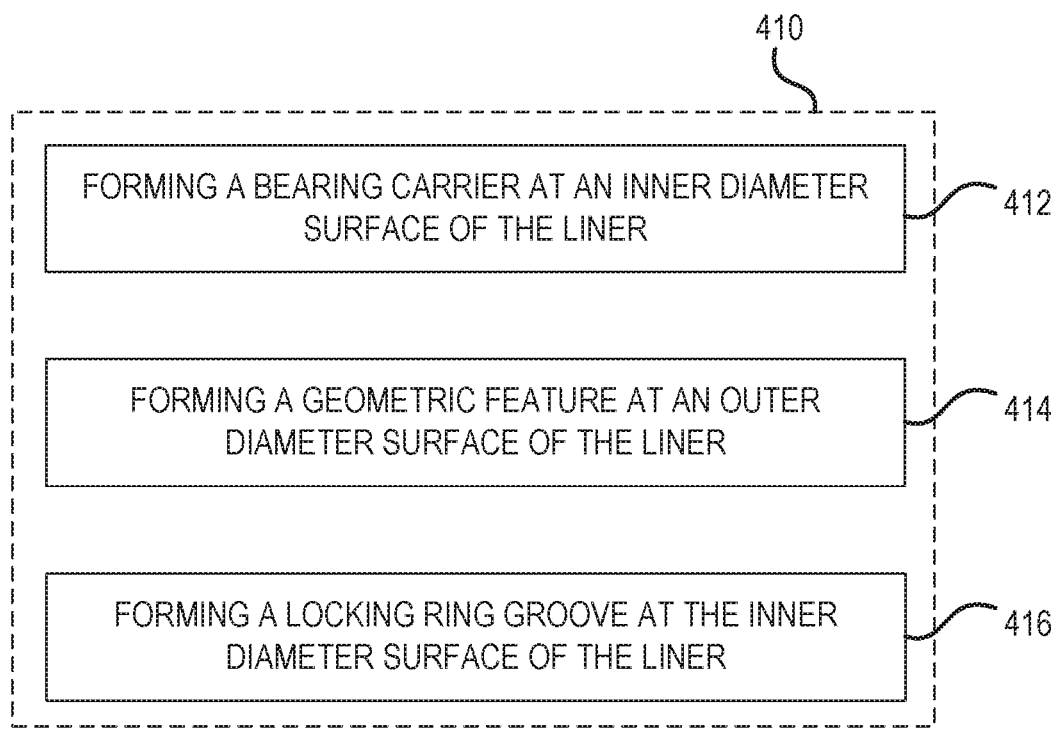
FIG. 4 illustrates a method for forming a metallic liner, in accordance with various embodiments.

With reference to FIG. 4, a method 410 for forming a metallic liner is provided, in accordance with various embodiments. Method 410 includes forming a bearing carrier at an inner diameter surface of the metallic liner (step 412). Method 410 may include forming a geometric feature at an outer diameter surface of the metallic liner (step 414). Method 410 may include forming a locking ring groove at an inner diameter surface of the metallic liner (step 416).

With combined reference to FIG. 2B and FIG. 4, step 412 may include forming bearing carrier 252 at inner diameter surface (e.g., wear resilient surface 217) of cylindrical body 261. Step 412 may be performed using a subtractive manufacturing process (e.g., using a lathe), a positive manufacturing process (e.g., 3D printing), a casting or molding process, or any other suitable manufacturing process. Step 414 may include forming geometric feature 262 the outer diameter surface of cylindrical body 261. Step 414 may be performed using a subtractive manufacturing process (e.g., using a lathe), a positive manufacturing process (e.g., 3D printing or welding), a casting or molding process, or any other suitable manufacturing process. Step 416 may include forming locking ring groove 264 the inner diameter surface (e.g., wear resilient surface 217) of cylindrical body 261. Step 416 may be performed using a negative manufacturing process (e.g., using a lathe), a positive manufacturing process (e.g., 3D printing), a casting or molding process, or any other suitable manufacturing process.

With reference to FIG. 2A and FIG. 2B, bearing carrier 252 may be co-axial with centerline axis 298. Wear resilient surface 217 may be co-axial with centerline axis 298. Composite layer 270 may be co-axial with centerline axis 298. Carrier surface 254 may be co-axial with centerline axis 298. Cylindrical body 261 may be co-axial with centerline axis 298. Locking ring groove 264 may be co-axial with centerline axis 298. Geometric feature 262 may be co-axial with centerline axis 298.

In various embodiments, composite layer 270 may comprise a polymer matrix composite. In various embodiments, composite layer 270 may comprise a polymer matrix composite reinforced by fibers such as a carbon, glass, organic fibers, or combinations thereof. In various embodiments, metallic liner 260 may be comprised of a metallic material, such as steel, aluminum, or titanium, among others.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A metallic liner, comprising:
   a cylindrical body defining a wear resilient surface;
   a bearing carrier extending radially inward from the wear resilient surface; and
   a locking ring groove disposed in the wear resilient surface, whereby an orifice support tube is retained in the cylindrical body;
   wherein the wear resilient surface and the cylindrical body are formed as a monolithic piece;
   the cylindrical body comprises a first open end and a second open end;
   the locking ring groove is disposed at the second open end of the cylindrical body and the bearing carrier is disposed at the first open end of the cylindrical body; and
   the second open end of the cylindrical body is configured to receive the orifice support tube into the cylindrical body.

2. The metallic liner of claim 1, wherein the bearing carrier comprises a carrier surface.

3. The metallic liner of claim 2, wherein an inner diameter of the carrier surface is less than an inner diameter of the wear resilient surface.

4. The metallic liner of claim 3, wherein the cylindrical body, the bearing carrier, the wear resilient surface, and the carrier surface, are concentric.

5. The metallic liner of claim 4, further comprising a geometric feature extending from the cylindrical body, wherein the geometric feature, the wear resilient surface, and the cylindrical body are formed as the monolithic piece.

6. The metallic liner of claim 4, wherein the bearing carrier defines a first slot, a second slot, and a third slot.

7. A strut cylinder, comprising:
   a composite layer; and
   a metallic liner disposed within the composite layer, the metallic liner comprising:
   a cylindrical body defining a wear resilient surface;
   a bearing carrier extending radially inward from the wear resilient surface;
   a locking ring groove disposed in the wear resilient surface, whereby an orifice support tube is retained in the cylindrical body;
   wherein the wear resilient surface and the cylindrical body are formed as a monolithic piece;

the cylindrical body comprises a first open end and a second open end;

the locking ring groove is disposed at the second open end of the cylindrical body and the bearing carrier is disposed at the first open end of the cylindrical body.

8. The metallic liner of claim 7, wherein the bearing carrier comprises a carrier surface, an inner diameter of the carrier surface is less than an inner diameter of the wear resilient surface.

9. The metallic liner of claim 8, wherein the composite layer, the cylindrical body, the bearing carrier, the wear resilient surface, and the carrier surface, are concentric.

10. The metallic liner of claim 9, further comprising a geometric feature extending from the cylindrical body, wherein the geometric feature, the wear resilient surface, and the cylindrical body are formed as the monolithic piece.

11. The metallic liner of claim 9, wherein the bearing carrier defines a first slot, a second slot, and a third slot.

12. A method for manufacturing a strut cylinder, comprising:

forming a metallic liner comprising a cylindrical body;

forming a bearing carrier at an inner diameter surface of the cylindrical body;

forming a locking ring groove at the inner diameter surface of the cylindrical body; and disposing a composite layer about the metallic liner, wherein the metallic liner comprises:

the cylindrical body defining the inner diameter surface;

the bearing carrier extending radially inward from the inner diameter surface;

the locking ring groove disposed in the inner diameter surface, whereby an orifice support tube is retained in the cylindrical body;

wherein the bearing carrier and the cylindrical body are formed as a monolithic piece;

the cylindrical body comprises a first open end and a second open end;

the locking ring groove is disposed at the second open end of the cylindrical body and the bearing carrier is disposed at the first open end of the cylindrical body.

13. The method of claim 12, further comprising forming a geometric feature at an outer diameter surface of the cylindrical body.

* * * * *